Mar. 6, 1923.
F. B. ROBERTS.
SPOTLIGHT AND MOUNT THEREFOR.
FILED JUNE 23, 1921.
1,447,891.
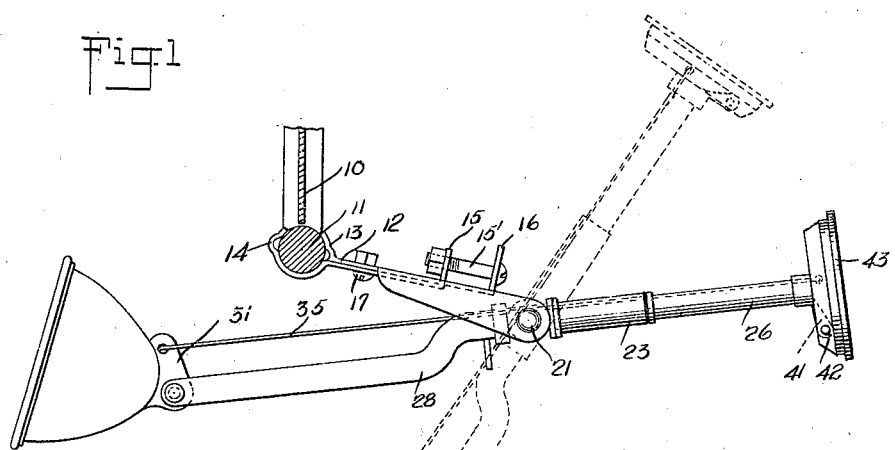
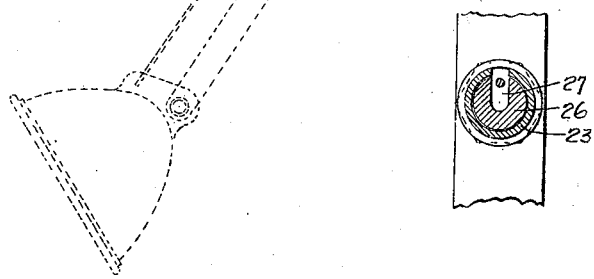
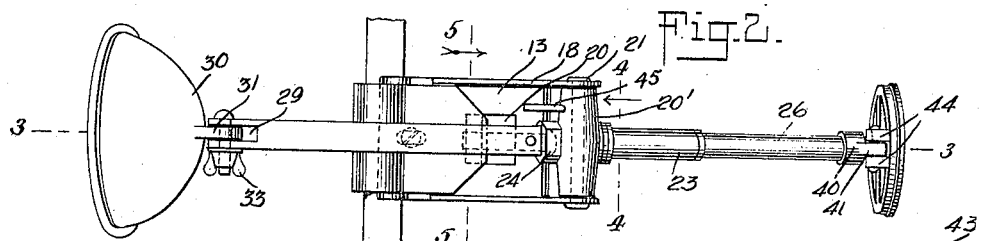
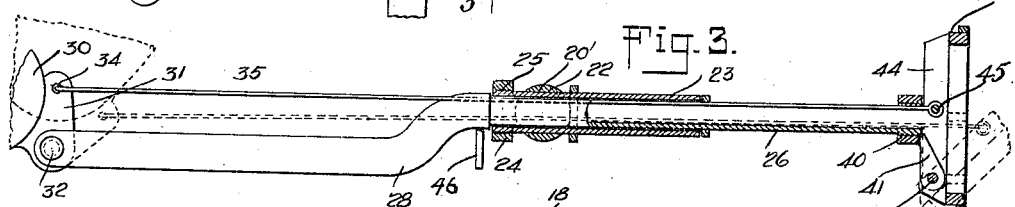
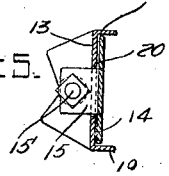
WITNESSES
INVENTOR
FRED B. ROBERT
BY
ATTORNEYS Patented Mar. 6, 1923.

1,447,891

UNITED STATES PATENT OFFICE.

FRED BYRON ROBERTS, OF FREEMAN, MISSOURI.

SPOTLIGHT AND MOUNT THEREFOR.

Application filed June 23, 1921. Serial No. 479,775.

*To all whom it may concern:*

Be it known that I, FRED BYRON ROBERTS, a citizen of the United States, and a resident of Freeman, in the county of Cass and State of Missouri, have invented a new and Improved Spotlight and Mount Therefor, of which the following is a full, clear, and exact description.

The present invention relates to new and useful improvements in spot lights and it pertains more particularly to a new and improved means for mounting the spot light on a vehicle, such as an automobile or the like.

It is one of the primary objects of the invention to provide means for supporting the spot light in such a manner as to render the same adjustable in both a vertical and a horizontal plane.

It is a further object of the invention to provide means by which the operations attendant the adjusting of the spot light are facilitated.

It is a still further object of the invention to so construct a device of this character that the movement of adjusting the light will be retarded in either direction for the purpose of preventing injury to the electrical connections of the light.

With the above and other objects in view, reference is had to the accompanying drawing in which—

Figure 1 is a sectional view of a wind shield showing the spot light and its supporting means in top plan view, the spot light being shown in one of its adjusted positions in full lines and in another of its adjusted positions in dotted lines.

Figure 2 is a rear elevation thereof.

Figure 3 is a top plan view partly in section and taken on the line 3—3 of Figure 2.

Figure 4 is a detail sectional view taken on the line 4—4 of Figure 2.

Figure 5 is a detail sectional view taken on the line 5—5 of Figure 2.

Referring more particularly to the drawings, the reference character 10 designates the windshield and 11 designates the frame thereof. Adapted to surround the frame 11 of the windshield 10 is a clamp 12 and said clamp 12 comprises two members 13 and 14, adapted to embrace the windshield frame. These two members 13 and 14 are maintained in engagement with the windshield frame 11 by means of a screw or the like 17. The member 13 is provided with a right-angular portion 15, and the member 14 is provided with a similar right-angular portion 16. These two portions 15 and 16 are perforated to receive a bolt or the like 15', by means of which the members are longitudinally adjustable with relation one to the other, in their clamping about the windshield frame 11.

The member 13 is provided on its upper edge with a flange 18 and upon its lower edge with a flange 19. Intermediate the flanges 18 and 19 the member 13 is provided with an opening 20 and the projection 15 of the member 14 passes therethrough, as more clearly indicated in Fig. 5. As shown in Figure 2, these flanges 18 and 19 form the support for a vertical trunnion 20', said trunnion being pivotally mounted between the flanges 18 and 19 by means of bolts, rivets or the like 21. This vertical trunnion 20' is provided with a passageway 22, and mounted in said passageway 22 is a tube 23. This tube 23 is secured in the passageway 22 by means of a nut or the like 24, which nut has screw-threaded engagement with the tube 23 as at 25.

Rotatably mounted within the tube 23 is a rod 26 and said rod 26 is provided with a groove or cut-out portion 27, the purpose of which will be hereinafter more fully described. The forward end of this rod 26 is offset, as indicated by the reference character 28, and the free extremity of said off-set portion 28 is bifurcated as at 29. Pivotally mounted between the furcations 29 of the offset end 28 of the rod 26, is a lamp box 30, said lamp box 30 having a bracket 31 which is perforated to receive a bolt 32, and said bolt carries a wing nut 33, by means of which the lamp 30 may be secured against movement relative to the offset end 28. The bracket 31 is perforated as at 34, and secured in said perforation 34 is an operating rod 100

35. This operating rod 35 lies in the groove 27 of the rod 26 and extends throughout the length thereof, as more clearly shown in Figure 3.

Rigidly secured to the rear end of the rod 26 is a bracket 40 and said bracket 40 has an offset lug 41. Pivotally mounted on the offset lug 41 of the bracket 40 by means of a shaft 42 is an operating wheel 43, this operating wheel 43 having a pair of spaced ribs or the like 44 secured to its rear face, which ribs form the means for pivotally mounting the wheel. The rear end of the rod 35 is secured between the ribs 44 as indicated by the reference character 45.

The device operates in the following manner:

With the parts in the position shown in full lines in Figure 1, the device may be moved to the dotted line position in this figure, by grasping the operating wheel 43 and rocking the trunnion 20' on the pivots 21, it being understood that the rod 26 is carried by the tube 23 in the trunnion 20'.

If, however, it is desired to throw the light into the air, as, for example, to show the number of a house, the operating wheel 43 is grasped and turned, thereby rotating the rod 26 in the tubular member 23, which operation turns the lamp upwardly. By this same operation the light from the lamp may be thrown to the rear or any other relative position on the car as desired.

If, on the other hand, it is desirable to change the position of the light in a horizontal plane, either to the right or left, the operating wheel 43 is rocked about its pivotal point 42 and through the medium of the rod 35 the lamp 30 will be rocked about its pivotal point 32, thus directing the beam either to the right or to the left in a horizontal plane.

It is to be noted that a pair of cooperating pins 45 and 46 carried by the trunnion 20' and the rod 26 respectively is provided, which function to limit the rotary movement of the rod within the trunnion to one complete revolution in either direction. This precludes the possibility of winding the wires which may be used to supply the spot-light with electric energy about the rod due to its continued rotation in a given direction which would impair a successful operation of the device.

From the foregoing it is apparent that the present invention provides a new and improved spotlight, together with a new and improved mount therefor, and that the mount provided renders the spotlight capable of universal adjustment.

Having thus described the invention, what is claimed is:

1. A spot-light support, comprising a bracket, a trunnion mounted therein, a rod carried thereby perpendicular to the axis of said trunnion, a spot-light, actuating means therefor, said light and said light actuating means being mounted on opposite ends of the rod, and a link connecting the light and its actuating means.

2. In a device of the class described, a bracket, a rod pivotally and rotatably mounted therein, a hand wheel pivotally mounted adjacent to one end of said rod, a spot-light pivotally mounted on the opposite end, and an operating link connecting the wheel and light.

3. A spot-light support, comprising a bracket, a trunnion mounted therein, a rotatable light supporting rod carried thereby, a spot-light pivotally mounted on the rod, actuating means therefor pivotally mounted on the rod to rotate the same, and means connecting the light and said actuating means whereby the same may be moved in unison on their respective pivots.

4. In a device of the character described, a bracket, a trunnion pivotally mounted therein, a tube carried by said trunnion, a rod extending through said tube, a spot-light pivotally carried by said rod, means carried by the rod for rotating the same within the tube, and means connected to said rod rotating means and to the spot-light for moving the spot-light about its pivotal point upon the rod.

5. A light support, comprising a bracket, a trunnion mounted therein, a rod rotatably mounted in the trunnion, a spot-light, a hand wheel, said light and said hand wheel being pivotally mounted on opposite ends of the rod, and a link connecting the light and the hand wheel whereby the light may be rotated on a horizontal axis or rocked on its pivot by a similar movement of the hand wheel.

6. A device of the class described, a bracket, a spot-light, a supporting rod therefor rotatably and pivotally carried by the bracket, means pivotally carried by the rod for rotating the same, and means connecting the light and said pivoted rod rotating means whereby said light may be universally adjusted.

7. A device of the class described comprising a bracket, a trunnion mounted therein, a tube carried thereby perpendicular to the axis thereof, a rod rotatably mounted in said tube, said rod being provided with a longitudinal groove, a light mounted on one end thereof, actuating means therefor mounted on the opposite end of the rod, and means connecting said light and light actuating means lying within the groove and being retained therein by said sleeve.

8. A device of the class described, comprising a bracket, a rod rotatably and pivotally mounted therein, said rod being offset intermediate its ends, a light pivotally mounted on one end of said rod and offset bracket carried thereby, said rod being provided with a longitudinal groove extending from said offset portion to one end thereof, light actuating means pivotally mounted adjacent to said end, and a link connecting said offset bracket and said light actuating means, said link being housed within said groove up to said offset portion of the rod and extending therefrom displaced from but substantially parallel to the light supporting end of the rod.

FRED BYRON ROBERTS.